US012388206B2

(12) United States Patent
Harmon, III et al.

(10) Patent No.: US 12,388,206 B2
(45) Date of Patent: Aug. 12, 2025

(54) HIGH SPEED ELECTRICAL CONNECTOR FOR COMMUNICATION SYSTEM

(71) Applicant: TE Connectivity Solutions GmbH, Schaffhausen (CH)

(72) Inventors: Dean Marlin Harmon, III, Etters, PA (US); Dustin Grant Rowe, Harrisburg, PA (US); Linda Ellen Shields, Mechanicsburg, PA (US); Michael Streckewald, Harrisburg, PA (US); Zachary Galbraith, Hummelstown, PA (US); Nitish Balakrishnan, Harrisburg, PA (US)

(73) Assignee: THE CONNECTIVITY SOLUTIONS GmbH, Schaffhausen (CH)

( * ) Notice: Subject to any disclaimer, the term of this patent is extended or adjusted under 35 U.S.C. 154(b) by 448 days.

(21) Appl. No.: 17/941,094

(22) Filed: Sep. 9, 2022

(65) Prior Publication Data

US 2024/0088587 A1 Mar. 14, 2024

(51) Int. Cl.

| | |
|---|---|
| ***H01R 12/71*** | (2011.01) |
| ***H01R 12/51*** | (2011.01) |
| ***H01R 12/70*** | (2011.01) |
| ***H01R 13/631*** | (2006.01) |
| ***H01R 13/658*** | (2011.01) |

(52) U.S. Cl.

CPC ........... *H01R 12/716* (2013.01); *H01R 12/51* (2013.01); *H01R 12/7011* (2013.01); *H01R 13/631* (2013.01); *H01R 13/658* (2013.01)

(58) Field of Classification Search

CPC .... H01R 12/76; H01R 12/51; H01R 12/7011; H01R 13/631; H01R 13/658

USPC ........................................................... 439/67

See application file for complete search history.

(56) References Cited

U.S. PATENT DOCUMENTS

| | | | | |
|---|---|---|---|---|
| 5,192,228 A * | 3/1993 | Collins | H01R 12/7064 439/567 |
| 7,163,421 B1 * | 1/2007 | Cohen | H01R 12/727 439/607.02 |
| 8,449,330 B1 * | 5/2013 | Schroll | H01R 13/514 439/607.06 |
| 9,356,401 B1 * | 5/2016 | Horning | H01R 13/6587 |
| 9,401,569 B2 * | 7/2016 | Davis | H01R 13/6585 |

(Continued)

FOREIGN PATENT DOCUMENTS

| | | | |
|---|---|---|---|
| CN | 201204312 Y * | 3/2009 | H01R 13/6586 |
| CN | 102738660 B * | 10/2015 | H01R 13/6586 |
| CN | 103296510 B * | 11/2015 | H01R 12/718 |

*Primary Examiner* — Peter G Leigh

(57) ABSTRACT

An electrical connector includes a conductive housing having a mating end and a mounting end mounted to a circuit board. The conductive housing provides electrical shielding around pockets and includes ground pads at the mounting end configured to be terminated to the circuit board. The electrical connector includes contact assemblies held by the conductive housing each having a contact holder holding at least one contact. The contact holder is received in the corresponding pocket of the conductive housing to position the at least one contact relative to the conductive housing. Each contact includes a mating end and a terminating end coupled to a signal pad of the circuit board. The conductive housing provides circumferential shielding around each contact assembly between the contact holder and the circuit board.

20 Claims, 5 Drawing Sheets

(56) References Cited

U.S. PATENT DOCUMENTS 9,543,676 B2 * 1/2017 Evans ................ H01R 13/6587
9,748,698 B1 * 8/2017 Morgan ............. H01R 13/6585
10,790,618 B2 * 9/2020 Munoz ................... H01R 12/73
2015/0303598 A1 * 10/2015 Jeon ....................... H01R 12/73
439/65
2015/0303599 A1 * 10/2015 Jeon ................... H01R 13/6587
439/65
2015/0303601 A1 * 10/2015 Jeon ................... H01R 12/7082
439/65
2015/0333420 A1 * 11/2015 Davis ................. H01R 13/6587
439/712

* cited by examiner

HIGH SPEED ELECTRICAL CONNECTOR FOR COMMUNICATION SYSTEM

BACKGROUND OF THE INVENTION

The subject matter herein relates generally to communication systems.

There is an ongoing trend toward smaller, lighter, and higher performance communication components and higher density systems, such as for ethernet switches or other system components. Typically, the system includes an electronic package coupled to a circuit board, such as through a socket connector. Electrical signals are routed between the electronic package and the circuit board. The electrical signals are then routed along traces on the circuit board to another component, such as a transceiver connector. The long electrical paths through the host circuit board reduce electrical performance of the system. Additionally, losses are experienced between the connector interfaces and along the electrical signal paths of the transceivers. Conventional systems are struggling with meeting signal and power output from the electronic package. Additionally, as data rates increase, conventional electrical connector designs suffer from signal integrity issues, such as at the interfaces between the electrical connector and the circuit board.

A need remains for a reliable communication system.

BRIEF DESCRIPTION OF THE INVENTION

In one embodiment, an electrical connector is provided and includes a conductive housing having a mating end and a mounting end. The mounting end configured to be mounted to a circuit board. The conductive housing includes pockets extending between the mating end and the mounting end. The conductive housing provides electrical shielding around the pockets. The conductive housing includes ground pads at the mounting end configured to be terminated to the circuit board. The electrical connector includes contact assemblies held by the conductive housing. Each contact assembly includes a contact holder holding at least one contact. The contact holder is received in the corresponding pocket of the conductive housing to position the at least one contact relative to the conductive housing. Each contact includes a mating end and a terminating end. The terminating end configured to be coupled to a signal pad of the circuit board. The conductive housing provides circumferential shielding around each contact assembly between the contact holder and the circuit board.

In another embodiment, an electrical connector is provided and includes a conductive housing having a mating end and a mounting end. The mounting end configured to be mounted to a circuit board. The conductive housing includes shielding walls extending between the mating end and the mounting end. The shielding walls define shield boxes surrounding pockets. The shield boxes provides electrical shielding on all sides of the pockets. The conductive housing includes ground pads along bottoms of the shielding walls configured to be terminated to the circuit board to electrically connect each shielding wall to the circuit board. The electrical connector includes contact assemblies held by the conductive housing. Each contact assembly includes a contact holder holding at least one contact. The contact holder is received in the corresponding pocket of the conductive housing to position the at least one contact relative to the conductive housing. Each contact includes a mating end and a terminating end. The terminating end configured to be coupled to a signal pad of the circuit board. The shield boxes provide circumferential shielding around each contact assembly between the mating end and the mounting end of the conductive housing.

In a further embodiment, a communication system is provided and includes a circuit board including an upper surface has a connector mounting footprint has an array of signal pads arranged in pairs. The signal pads are arranged in columns and rows. The circuit board includes a ground grid being electrically connected to a ground plane of the circuit board. The ground grid surrounds the pairs of signal pads. The ground grid includes ground strips extending along the columns and cross-strips extending along the rows. The cross-strips connect each of the ground strips. The communication system includes an electrical connector mounted to the connector mounting footprint. The electrical connector includes a conductive housing and contact assemblies held by the conductive housing. The conductive housing has a mating end and a mounting end mounted to the circuit board. The conductive housing includes pockets extending between the mating end and the mounting end. The conductive housing provides electrical shielding around the pockets. The conductive housing includes ground pads at the mounting end terminated to the ground grid of the circuit board. Each contact assembly includes a contact holder holding a pair of contacts. The contact holder is received in the corresponding pocket of the conductive housing to position the at least one contact relative to the conductive housing. Each contact includes a mating end and a terminating end. The terminating end coupled to the corresponding signal pad of the circuit board. The conductive housing provides circumferential shielding around each contact assembly between the contact holder and the ground grid.

DETAILED DESCRIPTION OF THE INVENTION

Figure 1:
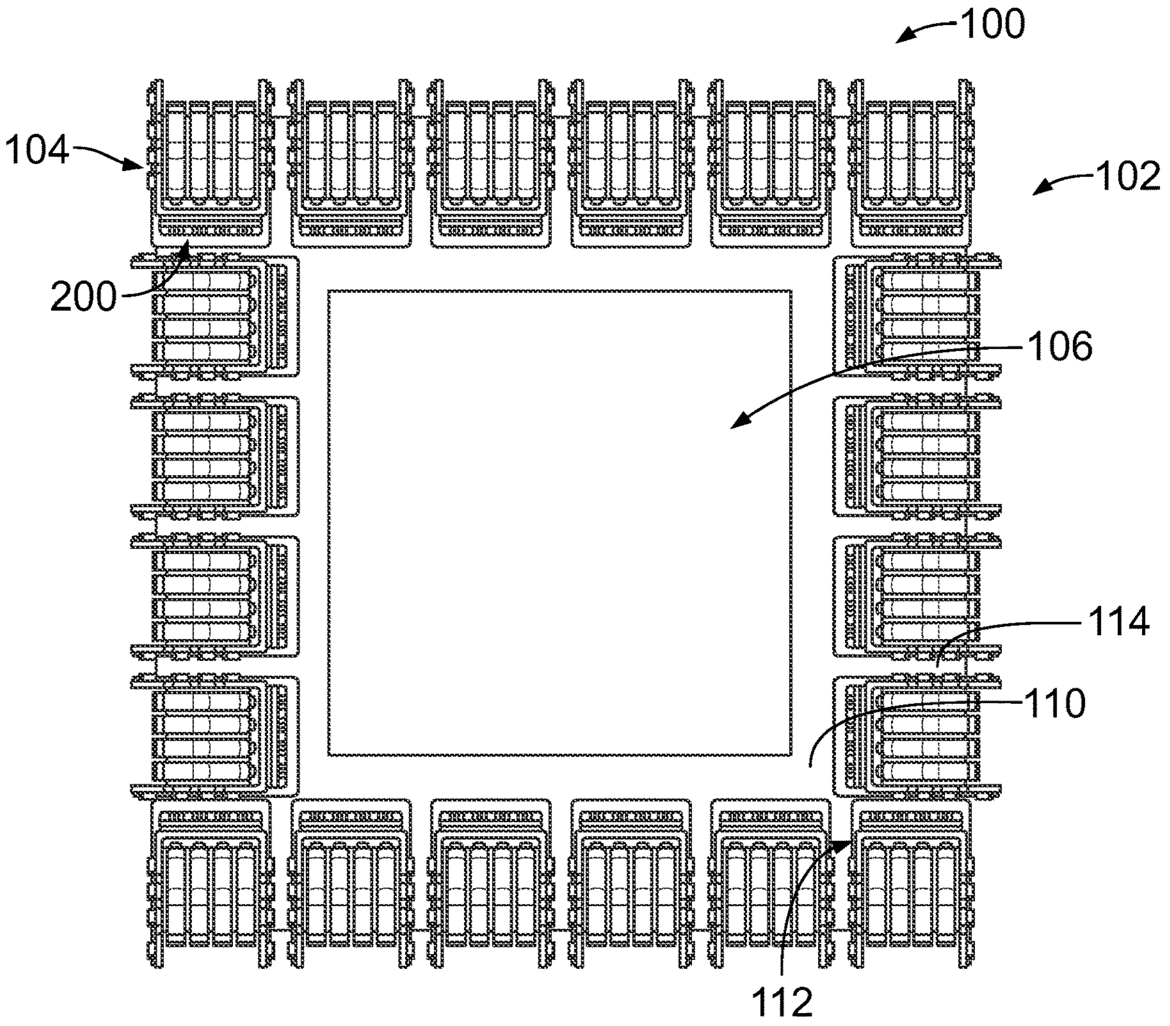
FIG. 1 is a top view of a communication system having an electronic assembly in accordance with an exemplary embodiment.

FIG. 1 is a top view of a communication system 100 having an electronic assembly 102 in accordance with an exemplary embodiment. The electronic assembly 102 includes one or more cable connector modules 104 electrically connected to a circuit board 110 by one or more electrical connectors 200. In various embodiments, the cable connector modules 104 may include optical modules using fiber optic cables for data transmission and/or electrical modules using electrical conductors and coper wire cables to transmit electrical data signals.

In an exemplary embodiment, the communication system 100 includes an electronic package 106 electrically connected to the circuit board 110. The cable connector modules 104 are electrically connected to the electronic package 106 through the circuit board 110. In various embodiments, the electronic package 106 may be an integrated circuit assembly, such as an ASIC. However, the electronic package 106 may be another type of communication component. The electronic package 106 may be mounted to the circuit board 110, such as being soldered to the circuit board 110.

In an exemplary embodiment, the electrical connectors 200 and the cable connector modules 104 are provided on multiple sides of the electronic package 106, such as around the edge of the circuit board 110. In the illustrated embodiment, the electrical connectors 200 and the cable connector modules 104 are provided on all four sides of the electronic package 106. Other arrangements are possible in alternative embodiments. In the illustrated embodiment, twenty (20) electrical connectors 200 and corresponding cable connector modules 104 are coupled to the circuit board 110 around the electronic package 106. Greater or fewer connectors may be provided in alternative embodiments. Each electrical connector 200 is mounted to a connector mounting footprint 112 at a mounting area on an upper surface 114 of the circuit board 110. The connector mounting footprint(s) 112 may be located adjacent the electronic package 106. The electrical connectors 200 may additionally or alternatively be mounted to a lower surface of the circuit board 110.

Figure 2:
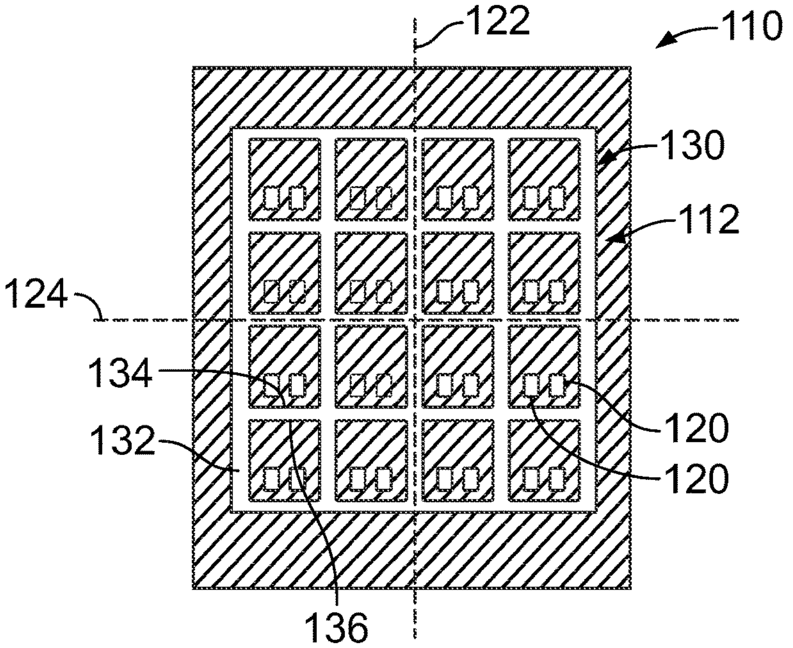
FIG. 2 is a top view of a portion of the circuit board in accordance with an exemplary embodiment showing one of the connector mounting footprints.

FIG. 2 is a top view of a portion of the circuit board 110 in accordance with an exemplary embodiment showing one of the connector mounting footprints 112. The circuit board 110 includes signal pads 120 and a ground grid 130 at the connector mounting footprint 112.

The signal pads 120 are arranged in an array, such as in rows and columns. The rows extend parallel to a primary axis 122 while the columns extend parallel to a secondary axis 124. The signal pads 120 may be pads or traces of the circuit board 110. In an exemplary embodiment, the signal pads 120 are high speed signal contacts. The signal pads 120 may be electrically connected to circuit traces routed through the circuit board 110, such as on one or more layers of the circuit board 110. In an exemplary embodiment, the signal pads 120 are arranged in pairs configured to transmit high speed, differential signals. In the illustrated embodiment, the connector mounting footprint 112 includes sixteen (16) pairs of the signal pads 120 arranged in a 4×4 array. Other arrangements are possible in alternative embodiments. Greater or fewer pairs of the signal pads 120 may be provided in alternative embodiments.

The ground grid 130 surrounds the pairs of the signal pads 120. The ground grid 130 defines, is part of, or is electrically connected to a ground plane of the circuit board 110. The ground grid 130 may be electrically grounded. The ground grid 130 is separated from the signal pads 120, such as by dielectric material and/or air. The ground grid 130 provides electrical shielding for the pairs of the signal pads 120. In an exemplary embodiment, the ground grid 130 includes ground strips 132 and cross-strips 134 connecting the ground strips 132. The ground strips 132 extend along the columns of the signal pads 120 and the cross-strips 134 extend along the rows of the signal pads 120. For example, the ground strips 132 extend parallel to the primary axis 122 and the cross-strips 134 extend parallel to the secondary axis 124. The ground strips 132 and the cross-strips 134 meet at intersections 136. In an exemplary embodiment, the ground grid 130 is continuous, such as completely surrounding the pairs of signal pads 120 on all four sides of the pairs of signal pads 120. For example, the ground grid 130 extends around the outer perimeter of the array of signal pads 120 and extends internally between the pairs of signal pads 120. In various embodiments, the ground strips 132 and the cross-strips 134 may have the same widths. Alternatively, the ground strips 132 may be wider or narrower than the cross-strips 134.

Figure 3:
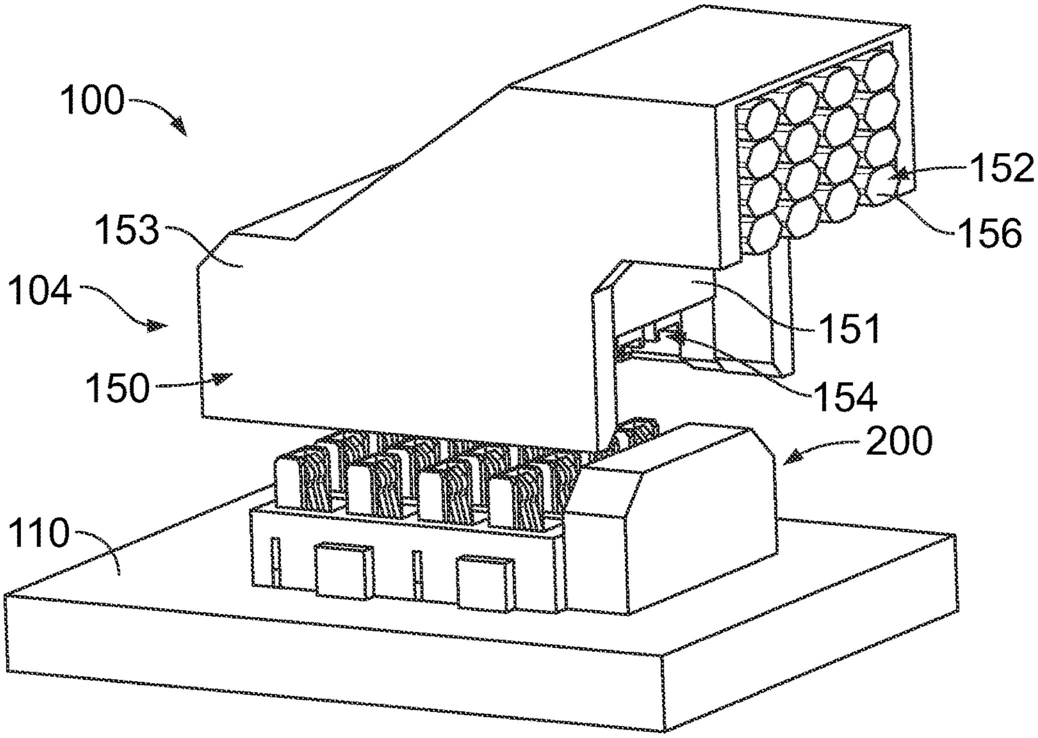
FIG. 3 is a rear perspective view of a portion of the communication system showing one of the electrical connectors mounted to the circuit board and showing the cable connector module posed for coupling to the electrical connector in accordance with an exemplary embodiment.
Figure 4:
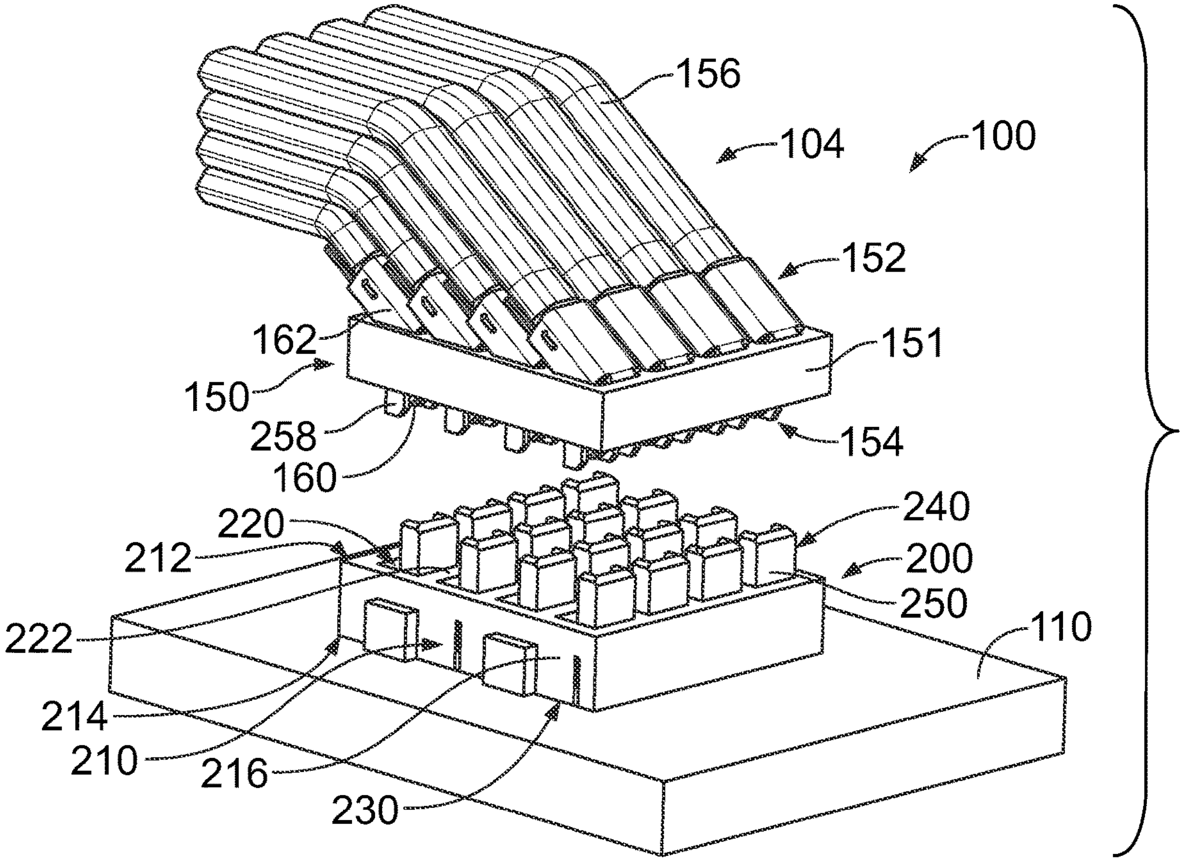
FIG. 4 is a front perspective view of a portion of the communication system showing one of the electrical connectors mounted to the circuit board and showing the cable connector module posed for coupling to the electrical connector in accordance with an exemplary embodiment.

FIG. 3 is a rear perspective view of a portion of the communication system 100 showing one of the electrical connectors 200 mounted to the circuit board 110 and showing the cable connector module 104 posed for coupling to the electrical connector 200. FIG. 4 is a front perspective view of a portion of the communication system 100 showing one of the electrical connectors 200 mounted to the circuit board 110 and showing the cable connector module 104 posed for coupling to the electrical connector 200. The cable connector module 104 is configured to be coupled to the electrical connector 200 from above.

The cable connector module 104 includes a connector housing 150 (FIG. 3) holding cable assemblies 152. In an exemplary embodiment, the connector housing 150 includes a conductive insert 151 (FIG. 4) and an outer shell 153 (FIG. 3). The outer shell 153 may be manufactured from a dielectric material. Each cable assembly 152 includes a contact assembly 154 and a cable 156 terminated to the contact assembly 154. The contact assembly 154 includes a contact holder 158 holding at least one contact 160 (shown in FIG. 4), such as a pair of contacts, and a shield 162 providing shielding for the contact(s) 158. The contact assemblies 154 may be arranged in an array, such as in rows and columns.

Figure 5:
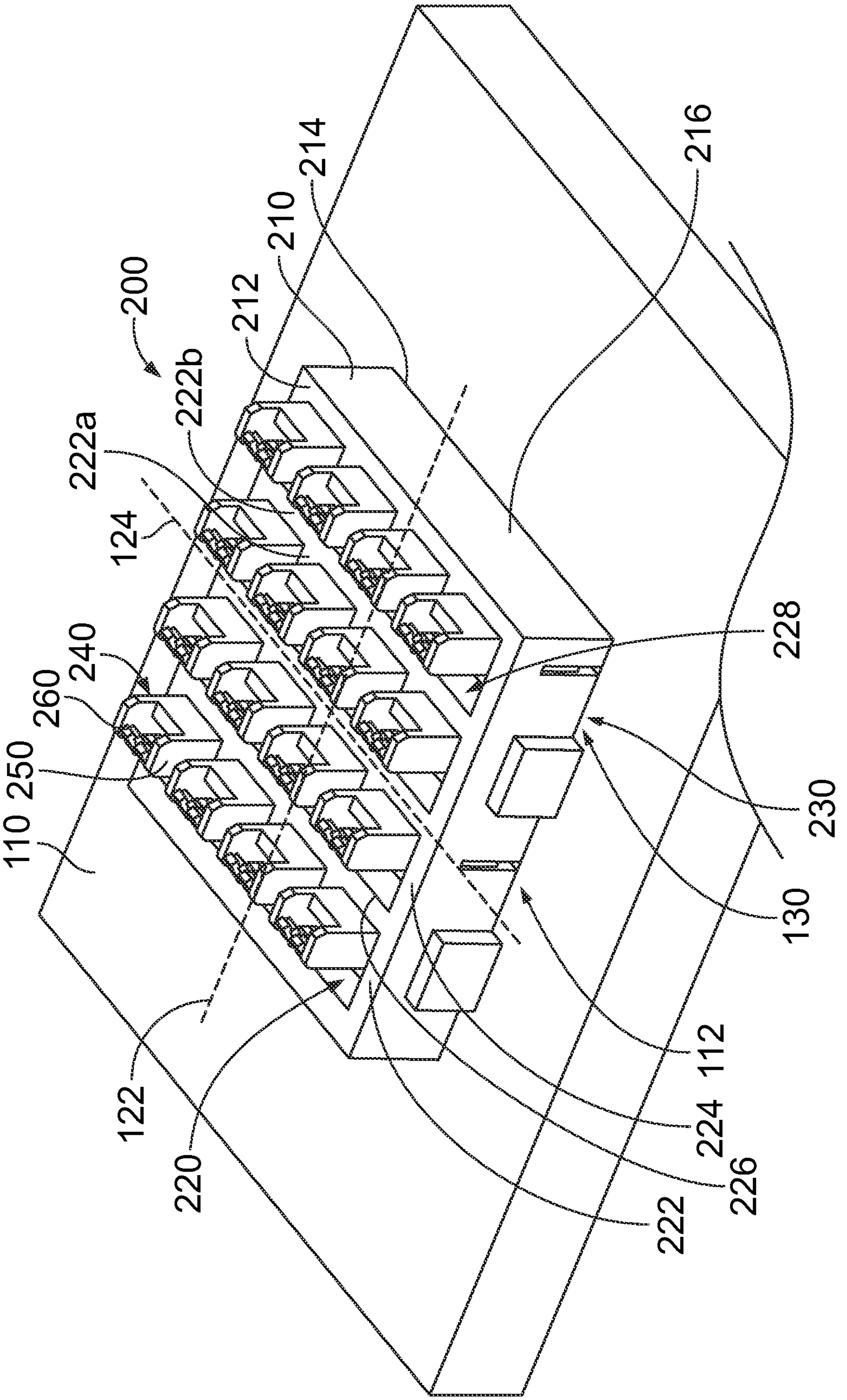
FIG. 5 is a top perspective view of the electrical connector in accordance with an exemplary embodiment mounted to the circuit board.

With additional reference to FIG. 5, which is a top perspective view of the electrical connector 200 in accordance with an exemplary embodiment mounted to the circuit board 110. The electrical connector 200 is mounted to the circuit board 110 at the connector mounting footprint 112. The electrical connector 200 includes a conductive housing 210 holding a plurality of contact assemblies 240. The contact assemblies 240 are electrically connected to the circuit board 110 and configured to be mated with corresponding contact assemblies of the cable connector module 104. The conductive housing 210 provides electrical shielding for the contact assemblies 240. The conductive housing 210 provides electrical shielding to the circuit board 110. For example, the conductive housing 210 may be connected to the ground grid 130 of the circuit board 110.

The conductive housing 210 is manufactured from a conductive material, such as a plated plastic material that may be selectively plated, such as on all sides of each pocket. The conductive material may be a conductive polymer, a metallic compound, or a cast or molded metal material in alternative embodiments. The conductive housing 210 includes a mating end 212 and a mounting end 214. The mating end 212 is configured to be mated to the cable connector module 104. The mounting end 214 is configured to be mounted to the circuit board 110. In the illustrated embodiment, the mating end 212 is at a top of the conductive housing 210 and the mounting end 214 is at a bottom of the conductive housing 210. However, the mating end 212 may be at other orientations, such as at a right angle relative to the mounting end 214. The conductive housing 210 includes sides 216 between the mating end 212 and the mounting end 214. In various embodiments, the conductive housing 210 is box-shaped having four sides 216. However, the conductive housing 210 may have other shapes in alternative embodiments.

The conductive housing 210 includes pockets 220 extending between the mating end 212 and the mounting end 214. The pockets 220 receive corresponding contact assemblies 240. The conductive housing 210 provides electrical shielding around the pockets 220. The pockets 220 may be open at the mating end 212 to receive portions of the contact assemblies of the cable connector module 104.

The conductive housing 210 includes ground pads 230 at the mounting end 214 configured to be terminated to the circuit board 110. The ground pads 230 may be soldered to the circuit board 110, such as to the ground grid 130. The ground pads 230 are provided at the bottom of the conductive housing 210.

In an exemplary embodiment, each contact assembly 240 includes a contact holder 250 holding at least one contact 260. In various embodiments, each contact holder 250 holds a pair of the contacts 260, which define a differential pair. The contact holder 250 is received in the corresponding pocket 220 of the conductive housing 210 to position the contacts 260 relative to the conductive housing 210. The contact holder 250 is manufactured from a dielectric material, such as a plastic material, to electrically isolate the contacts 260 from the conductive housing 210. The conductive housing 210 provides shielding for the contacts 260, such as between the mating end 212 and the mounting end 214. In an exemplary embodiment, the conductive housing 210 provides circumferential shielding (for example, perimeter shielding) around each contact assembly 240. The conductive housing 210 provides shielding to the circuit board 110, such as to provide shielding at the interface between the contacts 260 and the circuit board 110.

In an exemplary embodiment, the conductive housing 210 includes shielding walls 222 forming the pockets 220. The shielding walls 222 provide shielding on all sides of the pockets 220. The shielding walls 222 include outer walls 224 around the outer perimeter of the conductive housing 210 and separating walls 226 within an interior of the conductive housing 210. The separating walls 226 separate the pockets 220 from each other. The separating walls 226 provide electrical shielding between the pockets 220. The outer walls 224 provide shielding around the exterior of the corresponding pockets 220. In an exemplary embodiment, the pockets 220 are box shaped. However, the pockets 220 may have other shapes. The shielding walls 222 form shield boxes 228. The shield boxes 228 provide shielding on four sides of each pocket 220. In an exemplary embodiment, the pockets 220 are arranged in columns and in rows. The conductive housing 210 includes primary shielding walls **222*a* extending along the columns of the pockets 220 and secondary shielding walls 222*b* extending along the rows of the pockets 220. The secondary shielding walls 222*b* extend between the primary shielding walls 222*a*. The primary shielding walls 222*a* extend parallel to the primary axis 122. The secondary shielding walls 222*b* extend parallel to the secondary axis 124. The pockets 220 in the rows are separated from other pockets 220 by the primary shielding walls 222*a*. The pockets 220 in the columns the separated from other pockets 220 by the secondary shielding walls 222*b***.

Figure 6:
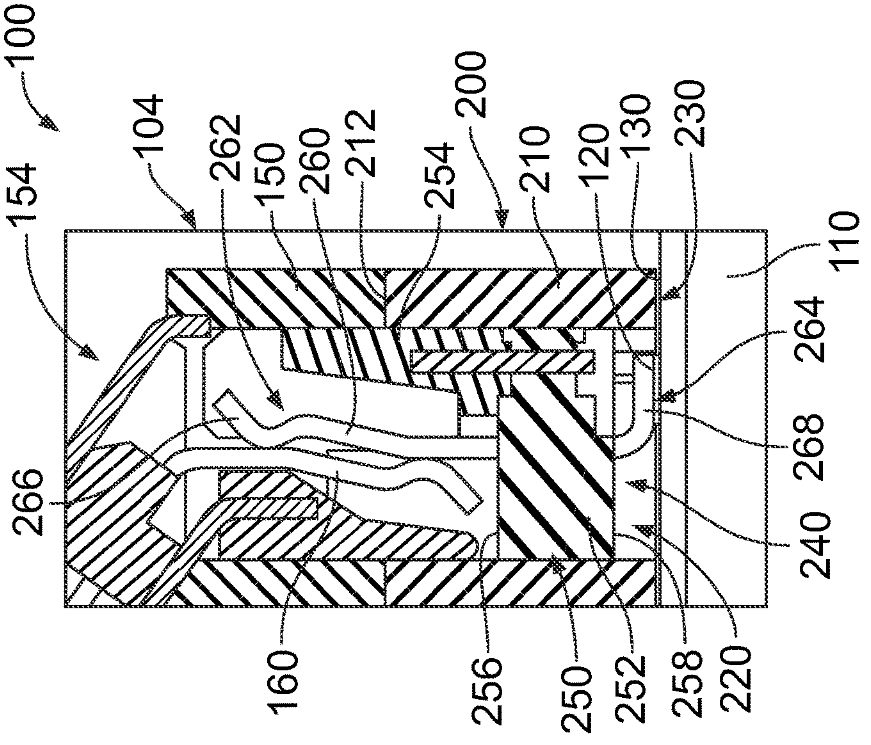
FIG. 6 is a cross-sectional view of a portion of the communication system showing the cable connector module coupled to the electrical connector in accordance with an exemplary embodiment.

FIG. 6 is a cross-sectional view of a portion of the communication system 100 showing the cable connector module 104 coupled to the electrical connector 200. FIG. 6 shows one of the contact assemblies 154 coupled to the corresponding contact assembly 240 of the electrical connector 200. The connector housing 150 and the conductive housing 210 create silos that surround and shield the contacts 160, 260. The shielding extends the lengths of the contacts 160, 260, such as from the circuit board 110 to the cable 156 (shown in FIG. 3).

In an exemplary embodiment, each contact holder 250 includes a base 252 and a tower 254 extending from the base 252. The tower 254 may be integral with the base 252, such as being co-molded with the base 252. Alternatively, the tower 254 may be molded separate from the base 252 and coupled thereto. The base 252 includes a top 256 and a bottom 258. In various embodiments, the base 252 is held in the pocket 220, such as by an interference fit. The top 256 of the base 252 may be located below the top of the conductive housing 210. The bottom 258 of the base 252 may be located above the bottom of the conductive housing 210. The tower 254 extends from the top 256 of the base 252, such as to a height above the mating end 212. For example, the tower 254 may extend to the exterior of the conductive housing 210, for example, into the connector housing 150. The contact 260 extends along the tower 254, such as into the connector housing 150. The contact 260 extends from the bottom 258 of the base 252 to the circuit board 110.

In an exemplary embodiment, each contact 260 includes a mating end 262 and a terminating end 264. The mating end 262 is configured to be mated to the contact 160. The terminating end 264 is configured to be terminated to the circuit board 110. In various embodiments, the mating end 262 includes a spring beam 266 having a mating interface. The spring beam 266 is deflectable. Other types of contacts may be provided in alternative embodiments, such as pins, sockets, blades, and the like. In various embodiments, the terminating end 264 includes a solder tail 268 configured to be soldered to the signal pad 120 of the circuit board 110. The solder tail 268 is located below the bottom of the base 252 of the contact holder 250. The solder tail 268 may be bent 90° to orient the solder tail 268 for soldering to the signal pad 120. Other types of terminating ends may be provided in alternative embodiments, such as compliant pins.

In an exemplary embodiment, the conductive housing 210 provides circumferential shielding around a portion of the contact 260 above the base 252, such as the spring beam 266. The conductive housing 210 provides circumferential shielding around a portion of the contact 260 below the bottom 258 of the base 252, such as the solder tail 268. In an exemplary embodiment, the conductive housing 210 provides shielding all the way from the base 252 to the circuit board 110. For example, the ground pads 230 at the bottom of the conductive housing 210 are connected (for example, soldered) to the ground grid 130 of the circuit board 110. As such, the solder tails 268 are entirely shielded to improve signal integrity at the interface with the circuit board 110.

Figure 7:
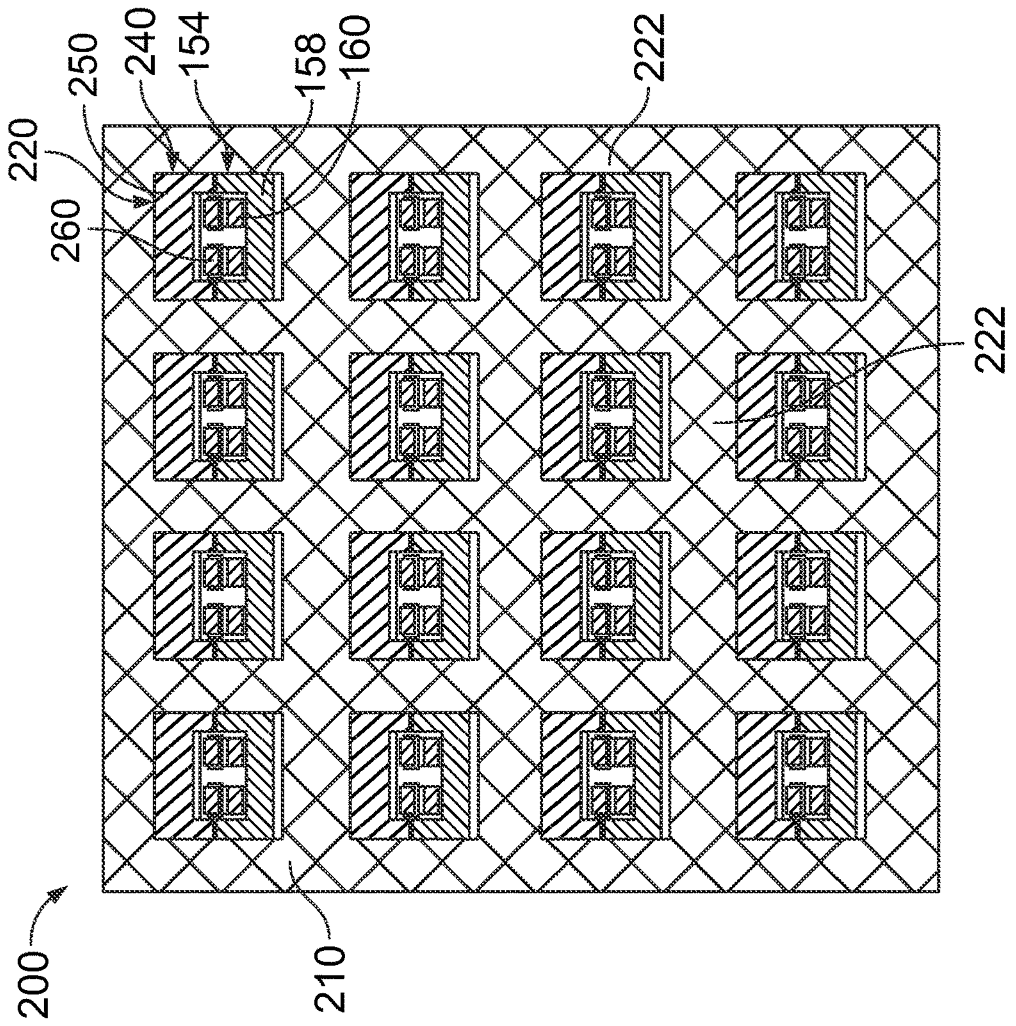
FIG. 7 is a cross-sectional view of the electrical connector showing portions of the cable connector module coupled to the electrical connector in accordance with an exemplary embodiment.

FIG. 7 is a cross-sectional view of the electrical connector 200 showing portions of the cable connector module 104 coupled to the electrical connector 200. When mated, the contact assemblies 154 are plugged into the pockets 220 of the conductive housing 210 to mated with the contact assemblies 240. The shielding walls 222 form a grid between the pockets 220. The shielding walls 222 provide shielding around the contact assemblies 154, 240. The shielding walls 222 provide electrical shielding between the pairs of the contacts 160, 260. The contact holders 158, 250 electrically isolate the contacts 160, 260 from the shielding walls 222.

In an exemplary embodiment, the shielding walls 222 provide circumferential shielding (for example, perimeter shielding) around the pockets 220. The circumferential shielding follows the shape of the perimeter of the pocket 220 (for example, may be rectangular, oval, circular or other shapes). In various embodiments, the circumferential shielding of the conductive housing 210 extends entirely circumferentially around each pocket 220 (for example, continuously or 360° or along all four sides). In other various embodiments, the circumferential shielding of the conductive housing 210 extends at least partially circumferentially around each pocket 220. For example, the circumferential shielding may cover greater than 50% of the perimeter of the pocket 220. The circumferential shielding may cover greater than 75% of the perimeter of the pocket 220 (for example, 270°). The circumferential shielding may be generally continuous, but may include small gaps or spaces, such as at slots in the shielding walls 22 that are provided for plugging of the contact assemblies 240 into the pockets 220.

Figure 8:
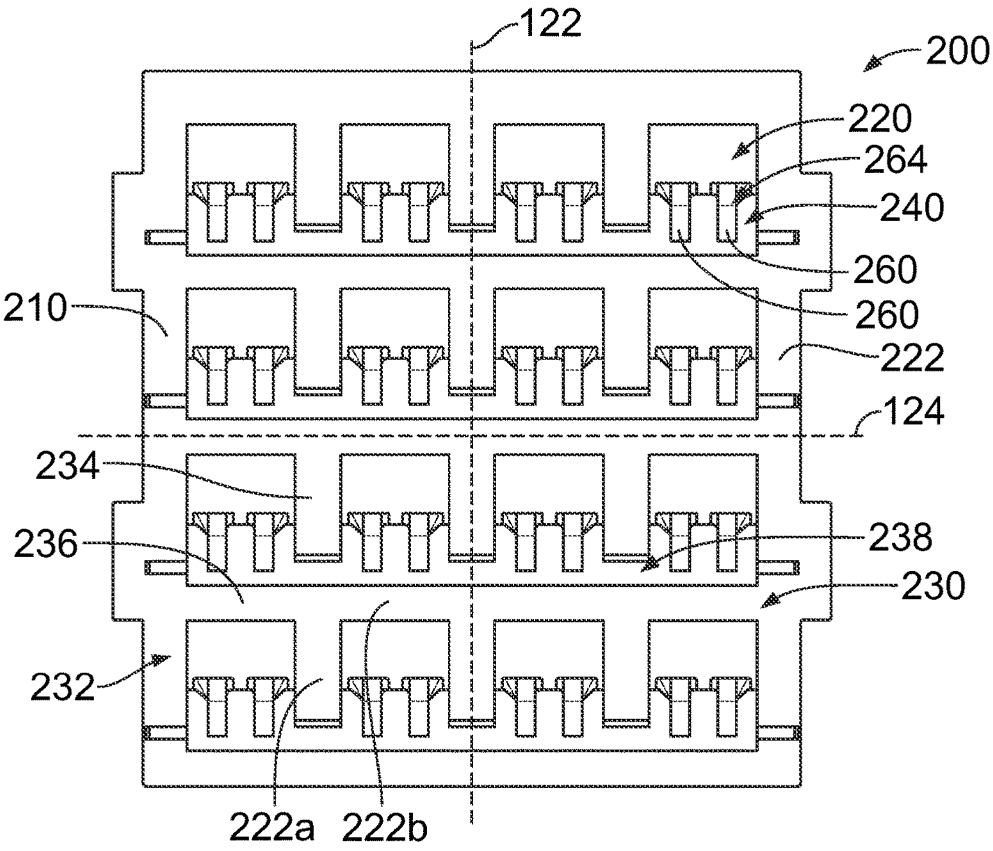
FIG. 8 is a bottom view of the electrical connector in accordance with an exemplary embodiment.

FIG. 8 is a bottom view of the electrical connector 200 in accordance with an exemplary embodiment. The electrical connector 200 includes the conductive housing 210 holding the contact assemblies 240. The conductive housing 210 provides electrical shielding for the contact assemblies 240. The conductive housing 210 is configured to be connected to the ground grid 130 of the circuit board 110 (shown in FIG. 2) to electrically common the conductive housing 210 with the ground plane of the circuit board 110.

The conductive housing 210 includes the ground pads 230 at the bottom of the conductive housing 210. The ground pads 230 are defined by the bottoms of the shielding walls 222. The ground pads 230 are configured to be coupled to the ground grid 130 of the circuit board 110, such as being soldered or compression coupled to the ground grid 130.

The ground pads 230 form a grid 232 at the bottom that surrounds the terminating ends 264 of the contacts 260. The ground pads 230 provide shielding on all sides of the pockets 220. The ground pads 230 provide 360° shielding around the terminating ends 264 of the contacts 260. In an exemplary embodiment, the ground pads 230 include ground pad strips 234 and ground pad cross-strips 236 connecting each of the ground pad strips 234. The ground pad cross-strips 236 may be oriented perpendicular to the ground pad strips 234. The separating walls 226 separate the pockets 220 from each other. The ground pad strips 234 and the ground pad cross-strips 236 provide electrical shielding between the pockets 220. In an exemplary embodiment, the ground pad strips 234 extend along the columns of the pockets 220 and the ground pad cross-strips 236 extend along the rows of the pockets 220. The ground pad strips 234 extend parallel to the primary axis 122. The ground pad cross-strips 236 extend parallel to the secondary axis 124. The pockets 220 in the rows are separated from other pockets 220 by the ground pad strips 234. The pockets 220 in the columns the separated from other pockets 220 by the ground pad cross-strips 236.

In various embodiments, the shielding walls 222 include slots 238 at the bottom. The slots 238 form gaps between the ground pads 230. The slots 238 are formed in the primary shielding walls 222*a*. The slots 238 are provided to receive the contact assemblies 240. For example, the contact assemblies 240 may be plugged into the pockets 220 and extend across the slots 238 between the pockets 220. As such, multiple contact assemblies 240 may be simultaneously loaded into the corresponding pockets 220. The slots 238 are relatively small to have minimal impact on shielding at the bottom of the conductive housing 210. For example, the slots 238 are narrow and the shielding walls 222 are capacitively coupled across the slots 238 to reduce EMI leakage through the slots 238. As such, the conductive housing 210 maintains 360° shielding around the pockets 220.

Figure 9:
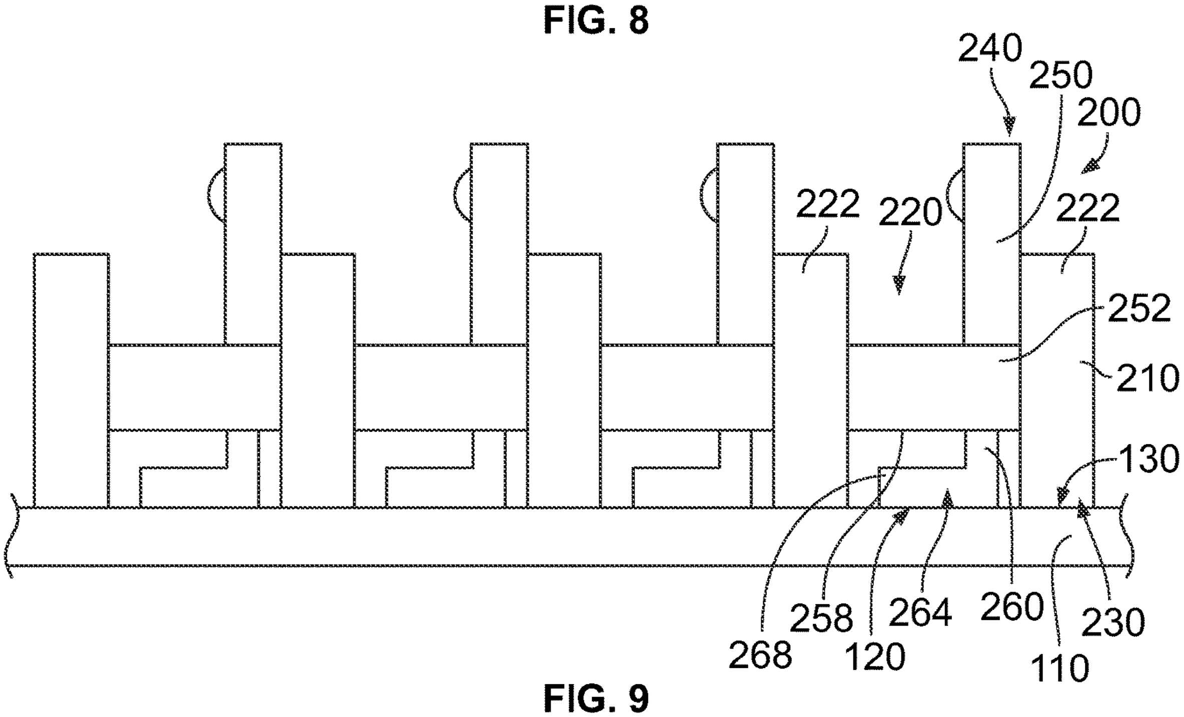
FIG. 9 is a cross-sectional view of the electrical connector in accordance with an exemplary embodiment.

FIG. 9 is a cross-sectional view of the electrical connector 200 in accordance with an exemplary embodiment. The shielding walls 222 form the pockets 220, which receive the contact assemblies 240. The base 252 of the contact holder 250 is positioned in the pocket 220 between the shielding walls 222. The base 252 may be press fit in the pocket 220. The solder tail 268 at the terminating end 264 of the contact 260 is located below the bottom of the base 252 for connection to the signal pad 120 of the circuit board 110. The conductive housing 210 provides shielding below the bottom 258 of the base 252, such as between the solder tails 268 in the adjacent pockets 222.

In an exemplary embodiment, the conductive housing 210 provides shielding along the solder tails 268, such as from the base 252 to the circuit board 110. For example, the ground pads 230 are connected to the ground grid 130 of the circuit board 110. As such, the solder tails 268 are entirely shielded to improve signal integrity at the interface with the circuit board 110. In an exemplary embodiment, the ground pads 230 are coplanar with the terminating ends 264 of the contacts 260. The conductive housing 210 provides circumferential shielding around the portions of the contacts 260 below the bottom 258 of the base 252.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. An electrical connector comprising:

a conductive housing having a mating end and a mounting end, the mounting end configured to be mounted to a circuit board, the conductive housing including pockets extending between the mating end and the mounting end, the conductive housing providing electrical shielding around the pockets, the conductive housing including ground pads at the mounting end configured to be terminated to the circuit board;

contact assemblies held by the conductive housing, each contact assembly including a contact holder holding at least one contact, the contact holder being received in the corresponding pocket of the conductive housing to position the at least one contact relative to the conductive housing, each contact includes a mating end and a terminating end, the terminating end configured to be coupled to a signal pad of the circuit board;

wherein the ground pads are coplanar with the terminating ends of the contacts; and wherein the conductive housing provides circumferential shielding around each contact assembly between the contact holder and the circuit board.

2. The electrical connector of claim 1, wherein the conductive housing provides 360° shielding for each pocket.

3. The electrical connector of claim 1, wherein the conductive housing includes shielding walls forming the pockets, the shielding walls providing shielding on all sides of the pockets.

4. The electrical connector of claim 3, wherein the pockets are box shaped, the shielding walls forming shield boxes providing shielding on four sides of each pocket.

5. The electrical connector of claim 1, wherein the ground pads provide 360° shielding around the terminating ends of the contact.

6. The electrical connector of claim 1, wherein the ground pads are configured to be soldered to the circuit board.

7. The electrical connector of claim 1, wherein the ground pads form a grid including ground pad strips and ground pad cross-strips connecting each of the ground pad strips.

8. The electrical connector of claim 1, wherein the contacts are arranged in pairs, each pair of the contacts being shielded from adjacent pairs of the contacts by the conductive housing.

9. The electrical connector of claim 1, wherein the pockets are arranged in columns and in rows, the conductive housing having primary shielding walls extending along the columns of the pockets and secondary shielding walls along the rows of the pockets between the primary shielding walls, the pockets in the rows being separated from other pockets by the primary shielding walls, the pockets in the columns the separated from other pockets by the secondary shielding walls.

10. The electrical connector of claim 1, wherein the contact holder includes a base and a tower extending from the base, the base having a top and a bottom, the base being received in the pocket, the tower extending from the top of the base to the exterior of the conductive housing, the conductive housing providing circumferential shielding around the base.

11. The electrical connector of claim 10, wherein the contacts extend from the bottom of the base to the circuit board, the conductive housing providing circumferential shielding around the portions of the contacts below the bottom of the base.

12. The electrical connector of claim 1, wherein the conductive housing is manufactured from a plated plastic material, from a conductive polymer, or from a metal material.

13. The electrical connector of claim 1, wherein the circumferential shielding of the conductive housing extends entirely circumferentially around each pocket.

14. The electrical connector of claim 1, wherein the circumferential shielding of the conductive housing extends at least partially circumferentially around each pocket covering greater than 50% of a perimeter of the pocket.

15. An electrical connector comprising:

a conductive housing having a mating end and a mounting end, the mounting end configured to be mounted to a circuit board, the conductive housing including shielding walls extending between the mating end and the mounting end, the shielding walls defining shield boxes surrounding pockets, the shield boxes providing electrical shielding on all sides of the pockets, the conductive housing including ground pads along bottoms of the shielding walls configured to be terminated to the circuit board to electrically connect each shielding wall to the circuit board;

contact assemblies held by the conductive housing, each contact assembly including a contact holder holding at least one contact, the contact holder being received in the corresponding pocket of the conductive housing to position the at least one contact relative to the conductive housing, each contact includes a mating end and a terminating end, the terminating end configured to be coupled to a signal pad of the circuit board;

wherein the ground pads provide 360° shielding around the terminating ends of the contacts; and wherein the shield boxes provide circumferential shielding around each contact assembly between the mating end and the mounting end of the conductive housing.

16. The electrical connector of claim 15, wherein the ground pads are coplanar with the terminating ends of the contacts.

17. The electrical connector of claim 15, wherein the ground pads form a grid including ground pad strips and ground pad cross-strips connecting each of the ground pad strips.

18. A communication system comprising:

a circuit board including an upper surface having a connector mounting footprint having an array of signal pads arranged in pairs, the signal pads being arranged in columns and rows, the circuit board including a ground grid being electrically connected to a ground plane of the circuit board, the ground grid surrounding the pairs of signal pads, the ground grid including ground strips extending along the columns and cross-strips extending along the rows, the cross-strips connecting each of the ground strips; and an electrical connector mounted to the connector mounting footprint, the electrical connector including a conductive housing and contact assemblies held by the conductive housing, the conductive housing having a mating end and a mounting end mounted to the circuit board, the conductive housing including pockets extending between the mating end and the mounting end, the conductive housing providing electrical shielding around the pockets, the conductive housing including ground pads at the mounting end terminated to the ground grid of the circuit board, each contact assembly including a contact holder holding a pair of contacts, the contact holder being received in the corresponding pocket of the conductive housing to position the at least one contact relative to the conductive housing, each contact includes a mating end and a terminating end, the terminating end coupled to the corresponding signal pad of the circuit board, wherein the conductive housing provides circumferential shielding around each contact assembly between the contact holder and the ground grid.

19. The communication system of claim 18, wherein the conductive housing includes shielding walls forming the pockets, the shielding walls providing shielding on all sides of the pockets.

20. The communication system of claim 18, wherein the ground pads form a grid including ground pad strips and ground pad cross-strips connecting each of the ground pad strips, the ground pad strips being connected to the ground strips of the ground grid, the ground pad cross-strips being connected to the cross-strips.

* * * * *